United States Patent
Chen et al.

(10) Patent No.: US 6,300,905 B1
(45) Date of Patent: Oct. 9, 2001

(54) LOCATION FINDING USING A SINGLE BASE STATION IN CDMA/TDMA SYSTEMS

(75) Inventors: Byron Hua Chen, Whippany; Tung Ching Chiang, Berkeley Heights; Ibrahim Tekin, Randolph, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/412,307

(22) Filed: Oct. 5, 1999

(51) Int. Cl.[7] ................................................. G01S 3/02
(52) U.S. Cl. .......................................... 342/458; 342/457
(58) Field of Search .......................... 342/357.06, 457, 342/458; 701/213; 455/456

(56) References Cited

U.S. PATENT DOCUMENTS

| | | | | |
|---|---|---|---|---|
| 5,475,864 | * | 12/1995 | Hamabe | 455/33.1 |
| 5,592,180 | * | 1/1997 | Yokev et al. | 342/450 |
| 5,945,948 | * | 8/1999 | Buford et al. | 342/457 |
| 5,973,643 | * | 10/1999 | Hawkes et al. | 342/457 |
| 5,999,131 | * | 12/1999 | Sullivan | 342/465 |

FOREIGN PATENT DOCUMENTS

| | | |
|---|---|---|
| 2314716 | 1/1988 | (GB) . |
| 9909778 | 2/1999 | (WO) . |
| 9944375 | 9/1999 | (WO) . |

* cited by examiner

Primary Examiner—Dao Phan

(57) ABSTRACT

A location or position of a wireless mobile unit is determined using only measurements from a single base station. A distance between the wireless mobile unit and the base station is calculated utilizing a roundtrip delay value of an RF uplink signal received from a wireless mobile unit. Thereafter, an angle of arrival of the received signal is determined using measurements of the received signal from each of a plurality of antenna sectors of a multi-sector antenna. The angle of arrival is determined based upon stored antenna signal measurements of the multi-sector antenna, wherein a combination of different sector signal measurements corresponds to a single angle measurement. Using the determined distance and angle of arrival, a position or location of a wireless mobile unit can easily be determined using only measurements of the single base station.

33 Claims, 9 Drawing Sheets

LOCATION FINDING USING A SINGLE BASE STATION IN CDMA/TDMA SYSTEMS

BACKGROUND OF THE INVENTION

1. Field of the Invention

The present invention relates to location or position determination, and more specifically to location or position determination of a wireless mobile unit.

2. Description of the Related Art

Figure 1:
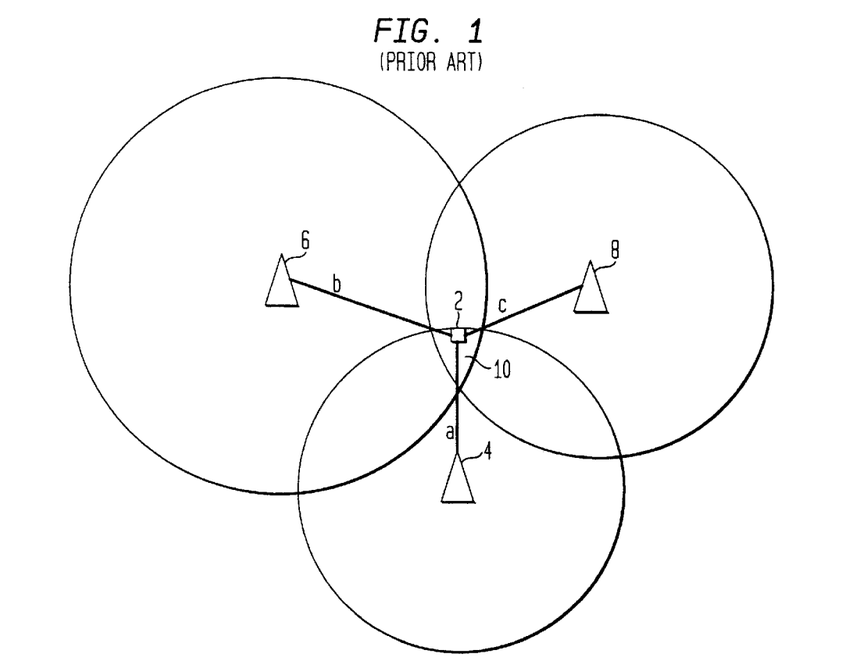
FIG. 1 illustrates a prior art system for estimating a calling area of a wireless mobile unit based on TOA.

Prior art FIG. 1 illustrates a known method for determining a location from which a mobile caller originates a call on a wireless mobile unit 2. Specifically, a call originating from the wireless mobile unit 2 reaches at least one cellular base station, such as base station 4. The signal of the call also typically reaches to a second base station 6 and a third base station 8. Base stations 4, 6 and 8 record the time at which a signal arrives from a wireless mobile unit 2. Methods for using these times to determine such a location of the wireless mobile unit 2 include both time difference of arrival (TDOA) and time of arrival (TOA) methods. These two methods are explained as follows.

Utilizing a known time of arrival (TOA) method as shown in FIG. 1, a first distance "a" between the wireless mobile unit 2 and first base station 4 is estimated; a second distance "b" between the wireless mobile unit 2 and second base station 6 is estimated; and a third distance "c" between the wireless mobile unit 2 and third base station 8 is estimated. Based on the time that it takes for the wireless signal to reach each of the base stations, the approximate distances "a", "b", and "c" are determined using the known TOA method, as follows.

As shown in FIG. 1, three circles are indicated, one around base station 4, one around base station 6, and one around base station 8. Each of the circles encircle the wireless mobile unit 2 and represent coverage areas of the base stations. The distances a–c from the base stations to the wireless mobile unit 2 are represented by the following three equations:

$$((x-x1)^2+(y-y1)^2)^{1/2}=a=C(t1-T)$$

$$((x-x2)^2+(y-y2)^2)^{1/2}=b=C(t2-T)$$

$$((x-x3)^2+(y-y3)^2)^{1/2}=c=C(t3-T)$$

In the above-mentioned equations, the coordinates of the wireless mobile unit 2 are represented by (x,y); the coordinates of base station 4 are represented by (x1,y1); the coordinates of base station 6 are represented by (x2,y2); and the coordinates of base station 8 are represented by (x3,y3). Further, t1, t2, and t3 represent half of the round trip delay (RTD) time of signals traveling from base station 4, base station 6, and base station 8, respectively to wireless mobile unit 2 and back. Finally, T is the processing time of wireless mobile unit 2 and C is the speed of light. Utilizing the known TOA method of detecting a location of a wireless mobile unit 2, the absolute time of the signal traveling from the wireless mobile unit 2 to the various base stations is measured to find the distances a, b and c and to eventually arrive at an approximate (x,y) location for the wireless mobile unit 2. However, the clock in the wireless mobile unit 2 may not exactly be synchronized with that of the various base stations 4, 6, and 8, thus making it difficult to determine the aforesaid absolute time. To compensate for clock synchronization problems, absolute time is measured by a round trip delay in the time of a signal sent from a particular base station to the wireless mobile unit 2 and back to the base station. However, round trip delay includes processing time in the wireless mobile unit 2 that needs to be estimated. Normally, it can be estimated based on the knowledge of a particular brand of the wireless mobile unit 2.

Another known option for deter mining a location of a wireless mobile unit 2 is to use a time difference of arrival (TDOA) method. TDOA measures the time difference of arrival for signals from the wireless mobile unit 2 to two or more base stations. Hence, the timing factors in the wireless mobile unit 2 are cancelled from the TOA equations expressed above. Assuming that the processing time of the wireless mobile unit is small or known, however, TOA can still be used.

Figure 2:
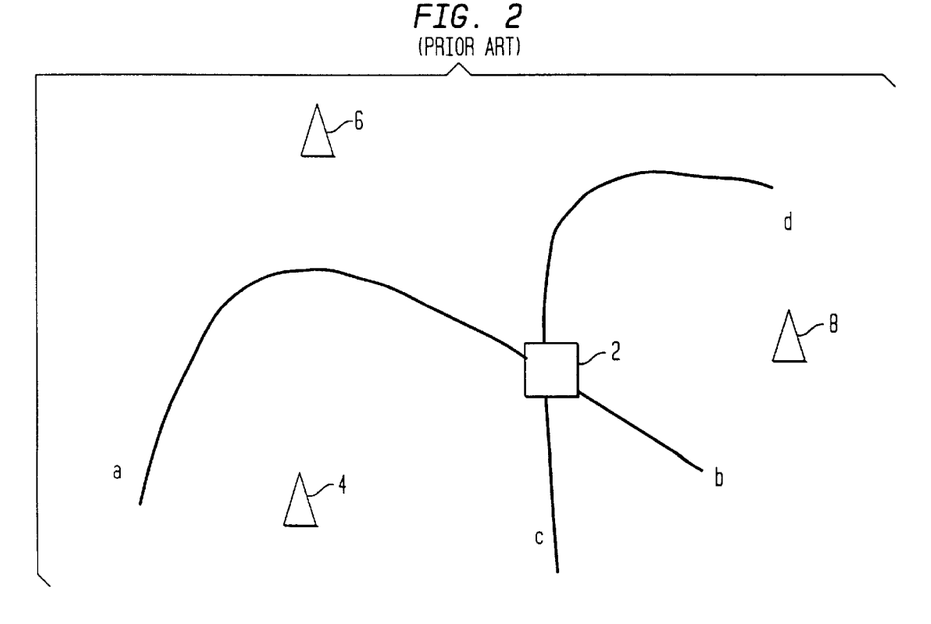
FIG. 2 illustrates a prior art system for estimating a calling area of a wireless mobile unit based on TDOA.

FIG. 2 illustrates an example of a TDOA method. The hyperbola "ab" is constructed using the TDOA between base station 6 and base station 4, in reference to the wireless mobile unit 2. Further, the hyperbola "cd" is constructed by using the TDOA between base station 6 and base station 8, in reference to the wireless mobile unit 2. The hyperbolas are determined, with the same coordinates and values previously expressed using TOA, based upon the following equations:

$$((x-x2)^2+(y-y2)^2)^{1/2}-((x-x1)^2+(y-y1)^2)^{1/2}=C(t2-t1)$$

$$((x-x3)^2+(y-y3)^2)^{1/2}-((x-x2)^2+(y-y2)^2)^{1/2}=C(t3-t1)$$

Using these equations, the (x,y) position of the wireless mobile unit 2 is determined.

Accordingly, with these known methods, TOA and TDOA can be used in an ideal situation to determine a location of a wireless mobile unit 2. However, as shown in FIGS. 1 and 2, both the TOA and TDOA methods require the detection of a signal(s) transmitted to/from at least three base stations, 4, 6 and 8 in order to utilize their methods to determine the location of a wireless mobile unit 2. In some instances, however, the signal cannot be detected by all three base stations 4, 6 and 8. An example of this situation is shown in prior art FIG. 3.

The known TOA and TDOA methods of detecting a location of a wireless mobile unit 2, in many instances, only provide an estimated location. Additionally, if all three base stations are not detected, the estimated area of location cannot even be detected.

Figure 3A:
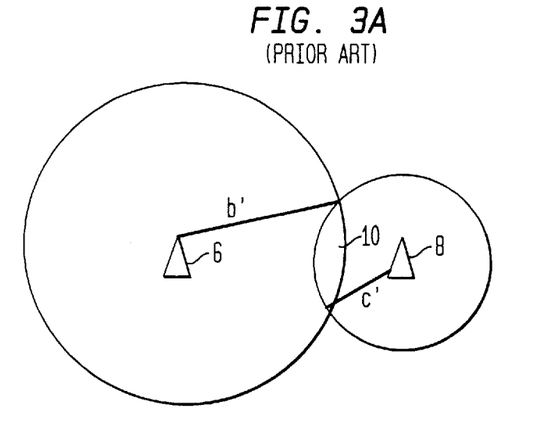
FIGS. 3(a) and 3(b) illustrate problems occurring in the prior art TOA and TDOA system of FIGS. 1 and 2.
Figure 3B:
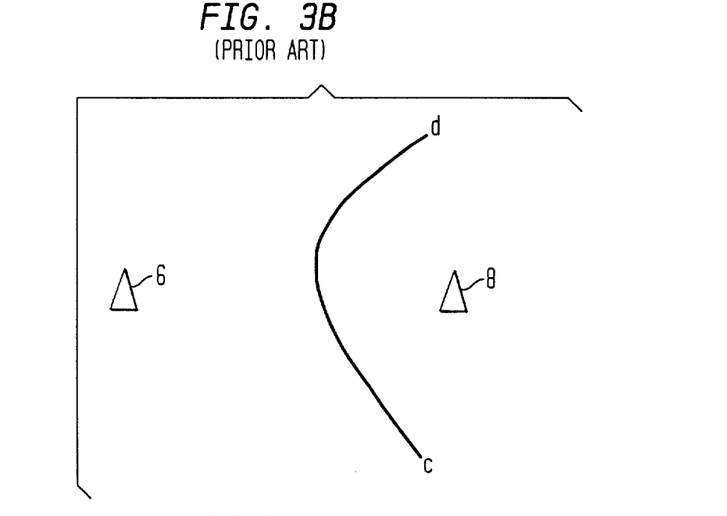

For example, as shown in prior art FIGS. 3(a) and 3(b), barriers such as buildings, for example, can block signals from being received by base stations. Accordingly, although the cellular call from wireless mobile unit 2 may still be able to go through, only a single base station may detect the call. If only two of the three base stations (6 and 8 as shown in FIG. 3(a) for example) can be detected, only two distances such as "b'" and "c'"can be calculated, resulting in non-unique solutions. If only one or two base stations can be detected, the location of the wireless mobile unit 2 can only be roughly estimated, at best.

As shown in FIG. 3(a) for example, if only two base stations 6 and 8 are identified in a TOA system, then only two circles can be determined and only a parabolic area 10 can be estimated as the approximately location of a wireless mobile unit 2. Similarly, if only base stations 6 and 8 are identified in a TDOA system, as shown in FIG. 3(b), only one parabola "cd" can be calculated and the location of the wireless mobile unit 2 can only be roughly estimated at best.

Accordingly, there is a need for a better system and method for determining the location of a wireless mobile unit 2, and especially using only a single base station.

SUMMARY OF THE INVENTION

A method and apparatus have been developed for determining a location or position of a wireless mobile unit using only measurements from a single base station. A distance between the wireless mobile unit and the base station is calculated utilizing a round trip (RTD) delay value of a signal received from the wireless mobile unit. Thereafter, an angle of arrival (AOA) of the received signal is determined using measurements of the received signal from each of a plurality of antenna sectors of a multi-sector antenna. The angle of arrival is determined based upon stored antenna signal measurements of the multi-sector antenna, wherein a combination of different sector signal measurements corresponds to a single angle measurement. Using the determined distance and angle of arrival, a position or location of a wireless mobile unit can easily be determined using only measurements of the single base station.

BRIEF DESCRIPTION OF THE DRAWINGS

The present application will become more fully understood from a detailed description of the preferred embodiments thereof, wherein like reference numerals represent like elements and wherein.

DETAILED DESCRIPTION

The system and method of the present application round trip delay (RTD) of a signal received from a wireless mobile unit, and an angle of arrival (AOA) of the signal, to locate a position of the mobile unit using only information from a single base station. In CDMA and TDMA systems, the distance between a wireless mobile unit and a base station is easily calculated using a roundtrip delay measurement obtained at the base station. By using a multi-sector antenna at the base station, such as one with three antenna sectors for example, and by prestoring antenna signal measurements of the multi-sector antenna, a combination of different antenna signal measurements will correspond to a single angle measurement. As such, actual multi-sector antenna measurements can be obtained and used to determine an AOA of a signal from the wireless mobile unit. Once the AOA of the signal and the distance between the wireless mobile unit and base station are determined, the actual position or location of the wireless mobile unit is easily obtained.

Figure 4:
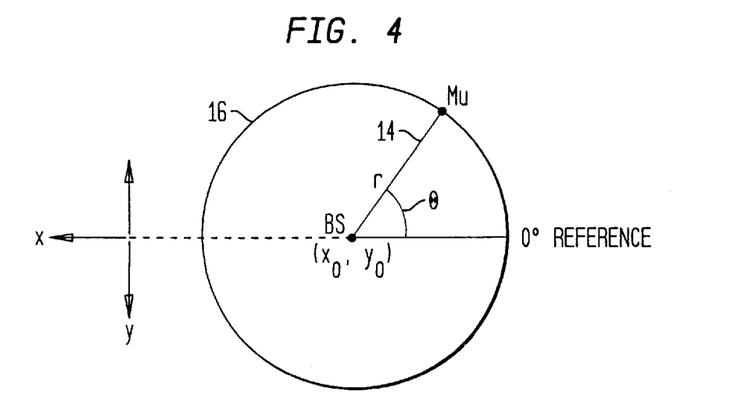
FIG. 4 illustrates determination of position of a wireless mobile unit using a single base station.

FIG. 4 illustrates how a position or location of a wireless mobile unit (MU) is determined using information from a single base station (BS). Initially, a distance 14 between MU and BS is determined from a roundtrip delay (RTD) of an uplink RF signal received at the base station (BS) from the MU. The RTD of a signal received from the wireless mobile unit is measured in a known manner. Once the RTD is determined, the distance 14 between the MU and BS is then calculated by RTD/2.

More specifically, the BS sends a pilot signal in a known manner to the MU at time $t_1$. Thereafter, the MU receives the pilot signal and transponds it back to the BS where it is received at a time $t_2$. The difference between $t_1$ and $t_2$ provides the RTD, which is measured in seconds. Preferably, signals transmitted by the BS, received by the MU, transmitted by the MU, and received by the BS, are time stamped. RTD is then calculated based on the time stamped signals. The distance 14("r") between the MU and BS is then calculated (in meters) as follows (noting that "c" is the speed of light):

$$\text{distance } 14 = c \cdot (RTD/2) \quad (1)$$

It should be noted that distance 14 can be calculated in any number of known ways, with the use of RTD being only one example thereof. All of these methods for calculating distance 14 fall within the scope of the present invention. This includes, for example, measuring a one-way delay (OWD). If the BS and MU have very accurate clocks referenced to a third source at each of the MU and BS (such as a GPS source), then the MU can measure a one-way delay (difference of time sent and arrived) and determine distance 14 therefrom (C*OWD).

Once the distance 14 is determined from equation (1), the distance can be considered as a radius ("r") of a circle 16 on which the MU is located. The center of the circle 16 is the BS receiving the signal from the MU. The BS is located at a known position $(X_0,Y_0)$. The exact position on the circle 16 of the wireless mobile unit is then determined by determining the angle of arrival (AOA), designated by θ in FIG. 4, of the uplink RF signal received from the MU. Once the AOA of the uplink RF signal from the MU is determined, the combination of the RTD measurement to determine distance ("r") 14, and the AOA measurement to determine angle θ from a single base station (BS) provides sufficient information to find the (x,y) location of the MU as follows:

$$x = x_0 + r \cos \theta \quad (2)$$

$$y = y_0 + r \sin \theta \quad (3)$$

Figure 5:
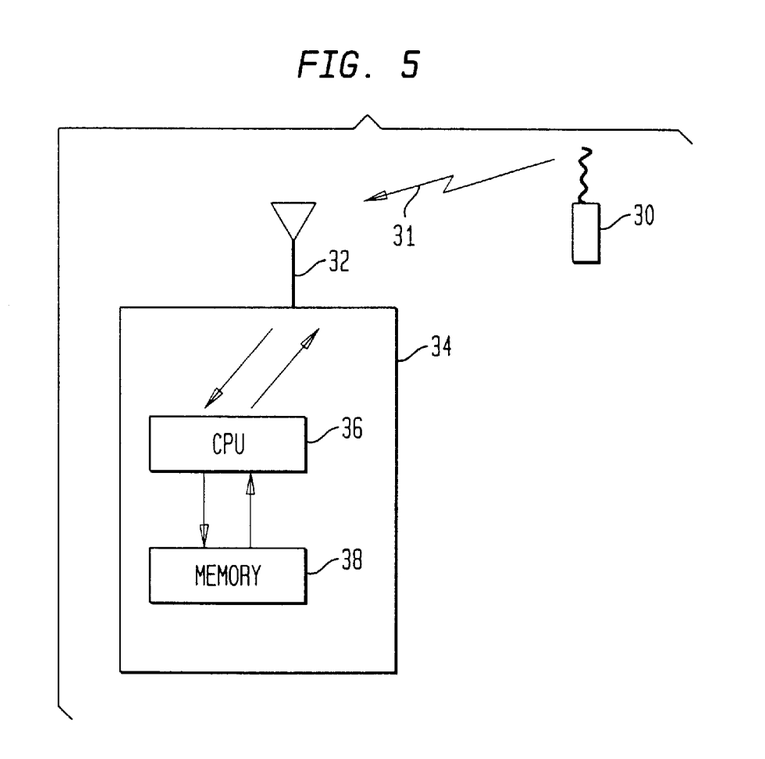
FIG. 5 illustrates a representative base station and wireless mobile unit.

FIG. 5 illustrates the wireless mobile unit 30 sending an RF uplink signal 31 to a base station 34. The base station 34 includes a multi-sector antenna 32 as will be explained in more detail hereafter; a central controller CPU 36; and a memory 38. The CPU 36 receives the RF uplink signal from the multi-sector antenna 32 (it receives an output from each sector or antenna component) and acts as a distance determining device and as a location calculator in conjunction with memory 38 to determine the RTD (or to determine distance 14 in some alternative manner), AOA, and location or position of the wireless mobile unit 30. It should be that the CPU 36 and memory 38 need not be present at base station 34, and need only receive signals from each antenna sector of the multi-sector antenna 32 of base station 34 so as to perform the aforementioned calculations. However, the CPU 36 and memory 38 are shown to be located within base station 34 in FIG. 5 for the sake of convenience.

Figure 6A:
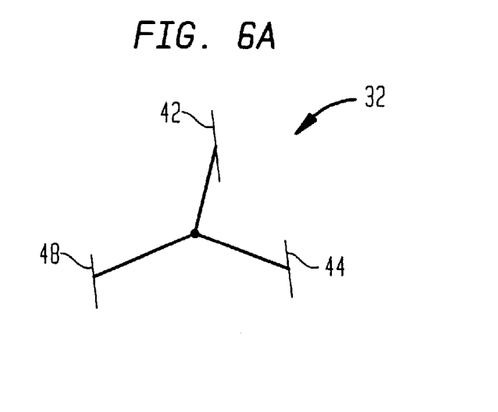
FIG. 6A illustrates three directional antenna sectors of a three sector base station antenna.
Figure 6B:
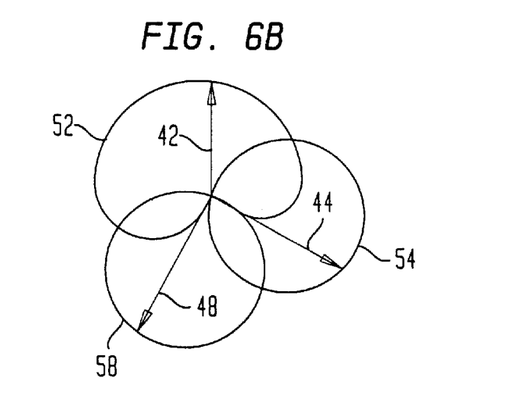
FIG. 6B is a representative illustration of areas of coverage for each of the three directional antenna sectors of FIG. 6A.

FIG. 6A illustrates three directional antenna components 42, 44 and 48 which makeup the multi-sector antenna 32. These can include three directional antennas, for example. The three directional antenna components 42, 44 and 48 are arranged so as to have antenna receiving patterns which cover overlapping areas as shown in FIG. 6B. For example, the antenna components 42, 44 and 48 are represented by the illustration in FIG. 4B, along with their corresponding areas of coverage 52, 54 and 58. Basically, for any particular angle of 360°, an area of coverage of two of the three antenna components is provided. This will be explained in more detail as follows.

Figure 7:
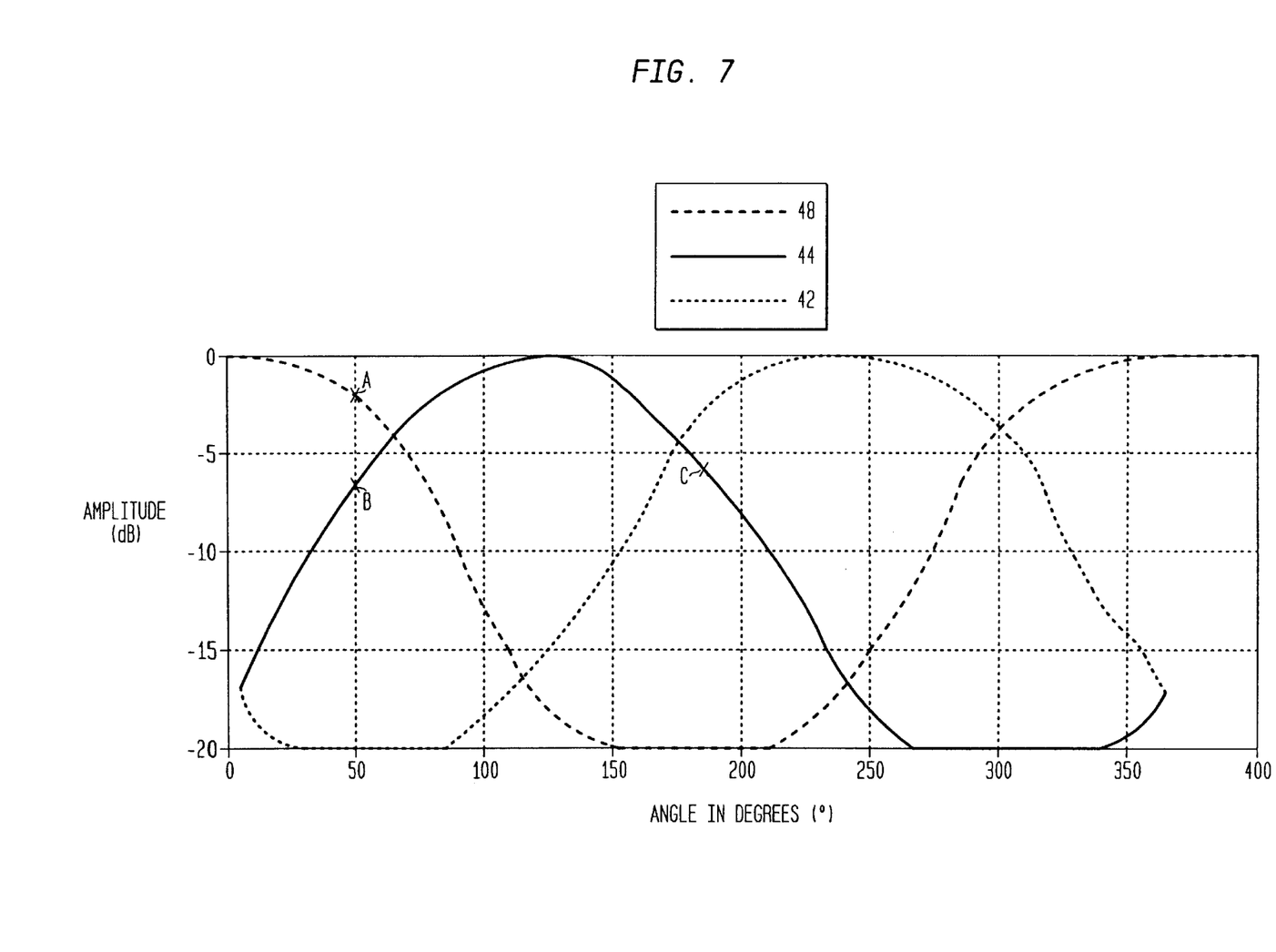
FIG. 7 illustrates directional antenna patterns versus azimuth angles spanning 360°.

FIG. 7 graphically illustrates the theoretical directional antenna pattern of antenna components 42, 44 and 48. When antennas are obtained or purchased, the theoretical measurements are known. FIG. 7 plots amplitude (measured in dB) of a received signal, versus angle (measured in degrees). On the chart in FIG. 7, the theoretical amplitude measurements of antenna component 42 are represented by a dotted line; the theoretical amplitude measurements of antenna component 44 are represented by a solid line; and the theoretical amplitude measurements of antenna component 48 are represented by a dash line.

As shown in FIG. 7, any particular angle from 0 to 360° is represented by a unique amplitude measurement of at least two of the three antennas. It should be noted that all amplitude measurements shown in FIG. 7 are normalized measurements, normalized based upon peak signal levels. The signal measurements shown in FIG. 7 are thus relative measurements between antenna components based upon a peak antenna component measurement and off-peak measurements of the other antenna components.

As an example, for antenna component 48, the peak signal measurement is considered to be obtained at the 0 degree angle as a reference point. The amplitude measurement is then normalized to 0 dB (the true measurement may be –80 dB, but it is normalized as a point of reference and is charted in FIG. 7 as 0 dB). Then, off-peak antenna component measurements are stored, such as that for antenna component 44, based on the normalized peak signal. A true measurement of the off-peak signal measured by antenna component 44 may correspond to –97 dB, but this is also normalized in FIG. 7, to –17 dB. As such, the theoretical measurements of FIG. 7 are obtained relative to one another and normalized based on reference values.

As an example of the measurements of FIG. 7, for an angle of 50°, the antenna component 48 normalized measurement corresponds to approximately –2.5 dB (as shown by element A in FIG. 7); and the normalized measurement of antenna component 44 corresponds to a measurement of approximately –6 dB (as represented by "B" in FIG. 7). Thus, although antenna component 44 corresponds to a normalized measurement of –6 dB for angles of both 50° and 180° (point C in FIG. 7), there is only one angle which corresponds to both a normalized measurement of –6 dB from antenna component 44 and a normalized measurement of –2.5 dB from antenna component 48. Thus, by using normalized measurements from at least two antenna components, an AOA of the received RF uplink signal is determined.

Figure 8A:
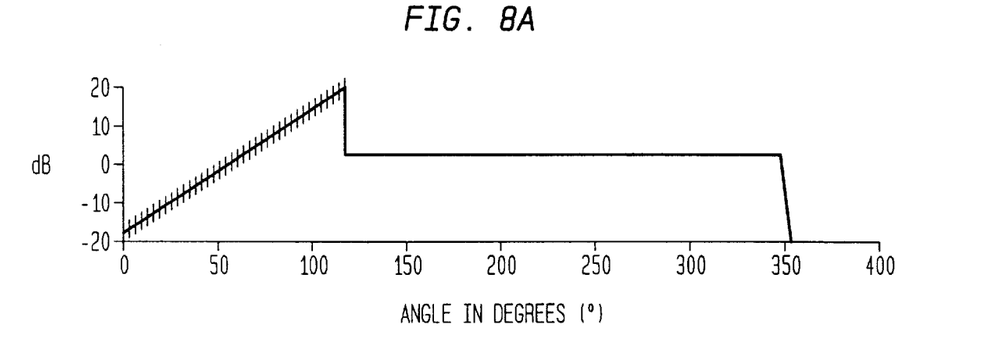
FIGS. 8A–8C illustrate amplitude ratios between two different directional antennas of the three sector base station antenna.
Figure 8B:
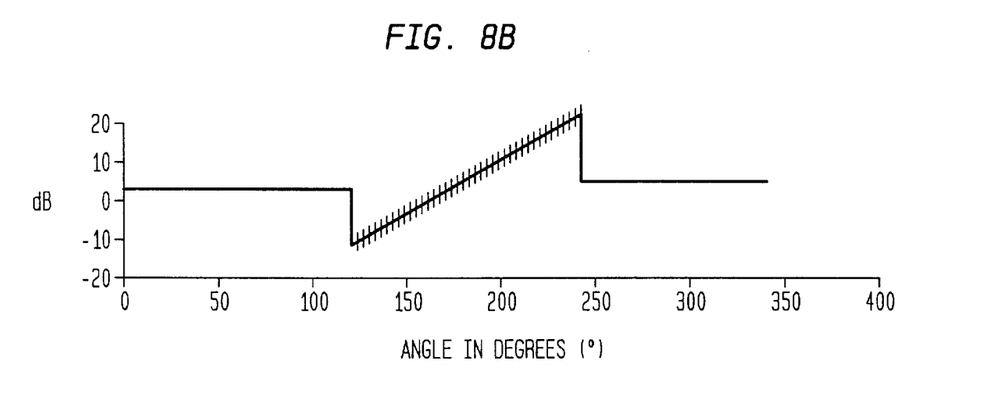
Figure 8C:
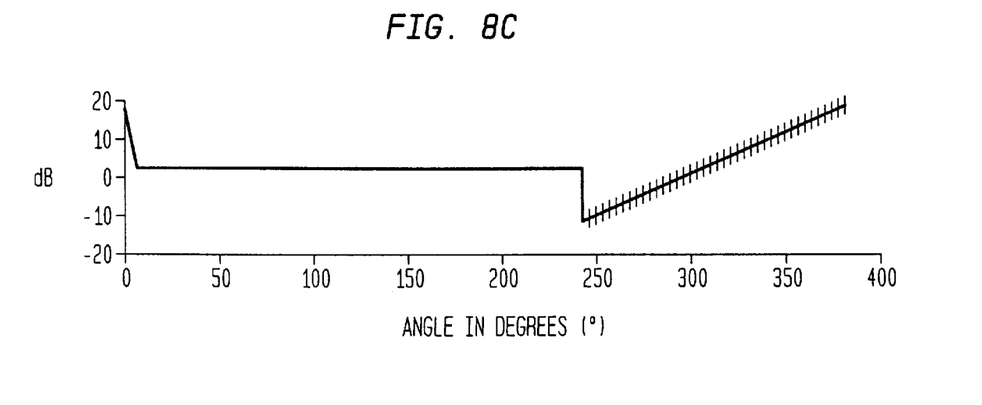

FIGS. 8A–8C illustrate amplitude differences (dB) of antenna component pairs versus angle, for pairs of each of the three antennas 42, 44 and 48, derived from the normalized measurements shown in FIG. 7. Amplitude difference measurements are inherently normalized since they correspond to differences of antenna component measurements. For example, if antenna component 48 measures a signal at –80 dB, and antenna component 44 measures the signal at –97 dB, even if the measurement of antenna component 48 is not normalized to 0 dB, the amplitude difference will still be equal to –17 dB.

These amplitude measurement difference versus angle patterns serve as lookup tables stored in memory 38 of base station 34, to determine the incoming angle of arrival (AOA) of the signal from the wireless mobile unit. FIG. 8A illustrates an amplitude measurement difference between antenna component 44 and antenna component 48; FIG. 8B illustrates an amplitude measurement difference between antenna component 42 and antenna component 44; and FIG. 8C illustrates an amplitude measurement difference between antenna component 48 and antenna component 42. As can be seen from viewing each of FIGS. 8A–8C, from 0 to approximately 120°, the difference between the antenna signal measurements of antenna component 44 and antenna component 48 are used to determine the angle of arrival of an incoming RF uplink signal from a wireless mobile unit; from approximately 120 to 240° the difference between the antenna signal measurements of antenna component 42 and antenna component 44 are used to determine the angle of arrival; and from 240° to 360°, the difference between the antenna signal measurements of antenna component 48 and antenna component 42 are used to determine the angle of arrival.

As shown in FIGS. 8A–8C, any particular angle of arrival from 0° to 360° is represented by a unique amplitude difference measurement. Using the example of FIG. 7, if antenna component 44 registers a measurement of approximately –6 dB and if antenna component 48 registers a measurement of approximately –2.5 dB, then FIG. 8A is used to determine the AOA. The measurement of antenna component 48 is subtracted from the measurement of antenna component 44 (–6 dB–(–2.5 dB)=3.5 dB), to reach a value of –3.5 dB. Using FIG. 8A, it is then determined that the AOA corresponding to –3.5 dB is 50°.

Accordingly, utilizing the three antenna component sectors of multi-sector antenna 32 of base station 34, an angle of arrival of an uplink RF signal from the wireless mobile unit is easily determined. Once the angle of arrival θ and distance 4 (from the roundtrip delay) are determined, since the coordinates of the base station are known $(X_0, Y_0)$, the (x,y) position or location of the wireless mobile unit can be easily determined using only signal measurements from a single base station in the manner described previously regarding equations (2) and (3).

A field test of an implementation of the method and system of the present application was conducted for a CDMA system. The test was divided into three steps: obtaining the lookup table used for obtaining AOA; obtaining the RTD; and estimating the location of the wireless mobile unit using AOA and RTD.

When actually obtaining a lookup table for storage in the memory of a base station to be used to determine AOA, the actual antenna patterns in the field deviated slightly from the theoretical patterns shown in FIGS. 7 and 8A–C. Moreover, the overlaps between adjacent antenna patterns may not be symmetrical as shown in FIG. 6 of the present application, due to fine adjustment for performance tuning. The actual antenna patterns, therefore, were measured using finger data recorded at the base station (a CDMA personal communication system (PCS) cell located in Whippany, N.J.) in conjunction with GPS data recorded at a test mobile unit driving around the base station. The finger data was collected utilizing a cell diagnostic monitor (CDM).

Figure 9:
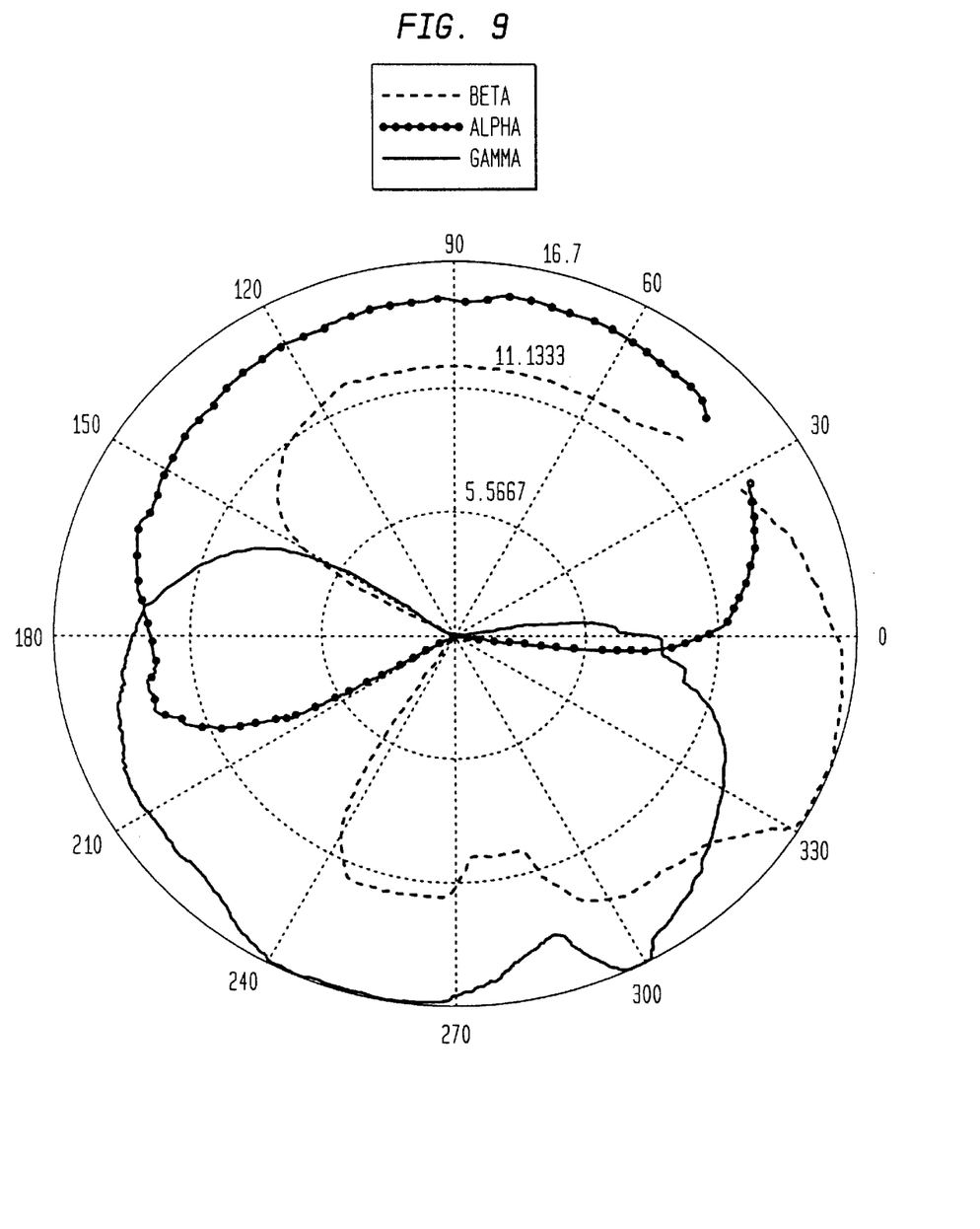
FIG. 9 illustrates energy levels of three sector antennas for a three sector base station.

FIG. 9 shows the resulting antenna patterns of the three sector base station antenna, wherein the antenna sector components are alpha, beta and gamma. The finger data from all antenna component sectors were collected utilizing the CDM and were filtered to remove noise. They were combined with GPS information of the test mobile to form a polar plot of finger energies (linear scale in dB) versus angles for each antenna component sector as shown in FIG. 9. Specifically, the alpha sector component is represented by the dotted line in FIG. 9; the beta sector component is represented by the dashed line in FIG. 9; and the gamma sector component is represented by the solid line in FIG. 9.

Figure 10A:
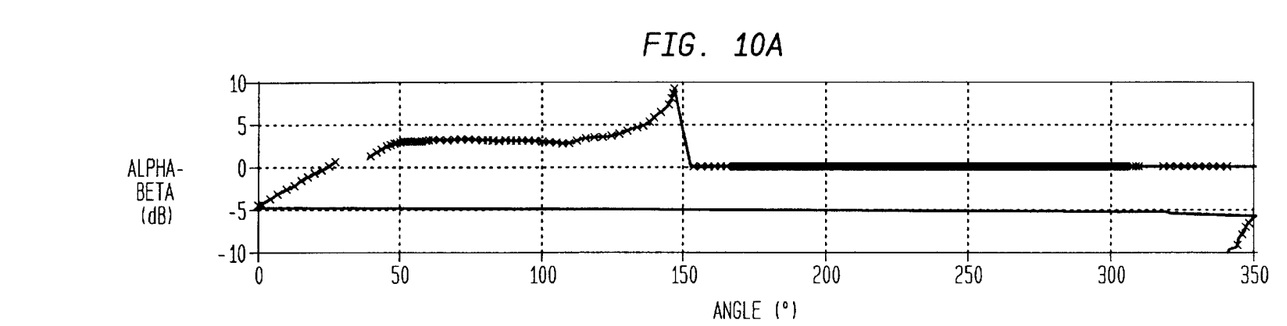
FIGS. 10A–10C illustrates amplitude differences between the three sector antennas shown in FIG. 9.
Figure 10B:
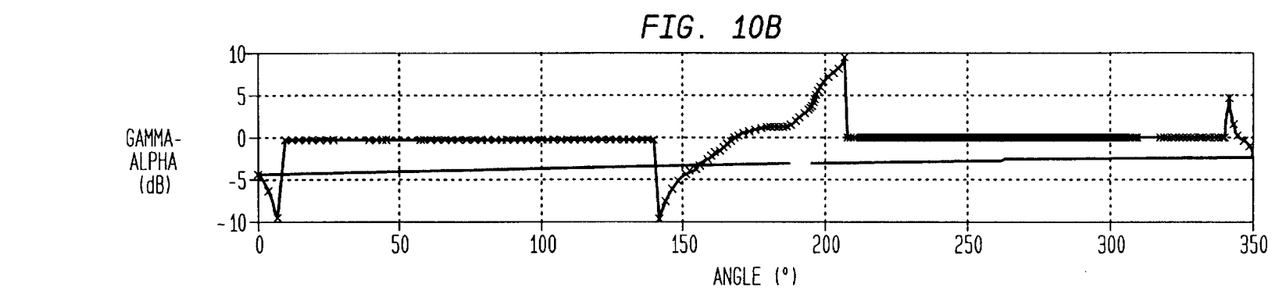
Figure 10C:
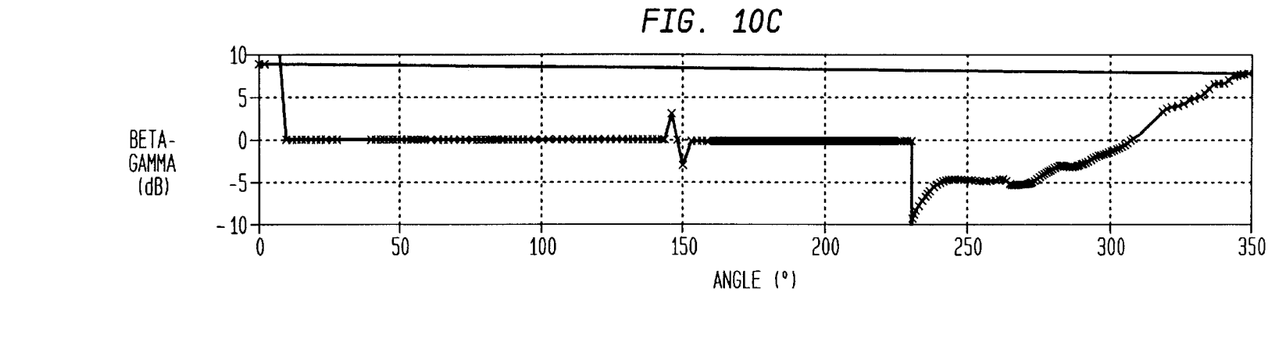

It should be noted that the drive route was not a perfect circle with equal radius due to restriction of available roads. Consequently, this resulted in certain deficiencies in the antenna component patterns derived, as shown in FIGS. 10A–10C. For instance, a segment of the driving route was extremely close to the intersection of the alpha and beta component sectors. As a result, a one-second interval of data swept 20° of angle. To the contrary, when the mobile unit was driving at the intersection of the beta and gamma sectors, a 1 second interval of data swept 1° of angle only. This non-uniform conversion created discrete angles. By applying a moving average to the angles, smooth antenna patterns were obtained as shown in FIGS. 10A–10C.

Specifically, FIG. 10A represents a difference between the alpha and beta sector component vs. angle; FIG. 10B represents a difference between the gamma and alpha sector components vs. angle; and FIG. 10C represents a difference between the beta and gamma sector components vs. angle. These charts of FIGS. 10A–C are then stored as a lookup table in memory.

As shown in FIG. 9, the dashed, solid and dotted lines show the finger energies for the beta, alpha and gamma component sectors respectively. The numbers within the circles are finger energy levels in a linear scale. Note that a gap between 30 and 40° is caused by a lack of data To To determine the AOA from the antenna patterns shown in FIG. 9, a similar plot (serving as the lookup table stored in memory at the base station) as that previously described with regard to FIGS. 8A–8C is obtained, represented by FIGS. 10A–C. These plots reflect amplitude differences versus angle. Note that these plots resemble the ones for the antenna component patterns shown in FIGS. 8A–8C. It should be further noted that the amplitude difference is flat at some regions, resulting in an ambiguity for the AOA estimation. However, these ambiguities were only caused by the closeness of the driving routes of the base station, and are not reflective of any deficiencies and the techniques of the present application. Accordingly, with such lookup tables in place, an AOA of an incoming RF uplink signal from a wireless mobile unit was easily obtained.

Figure 11:
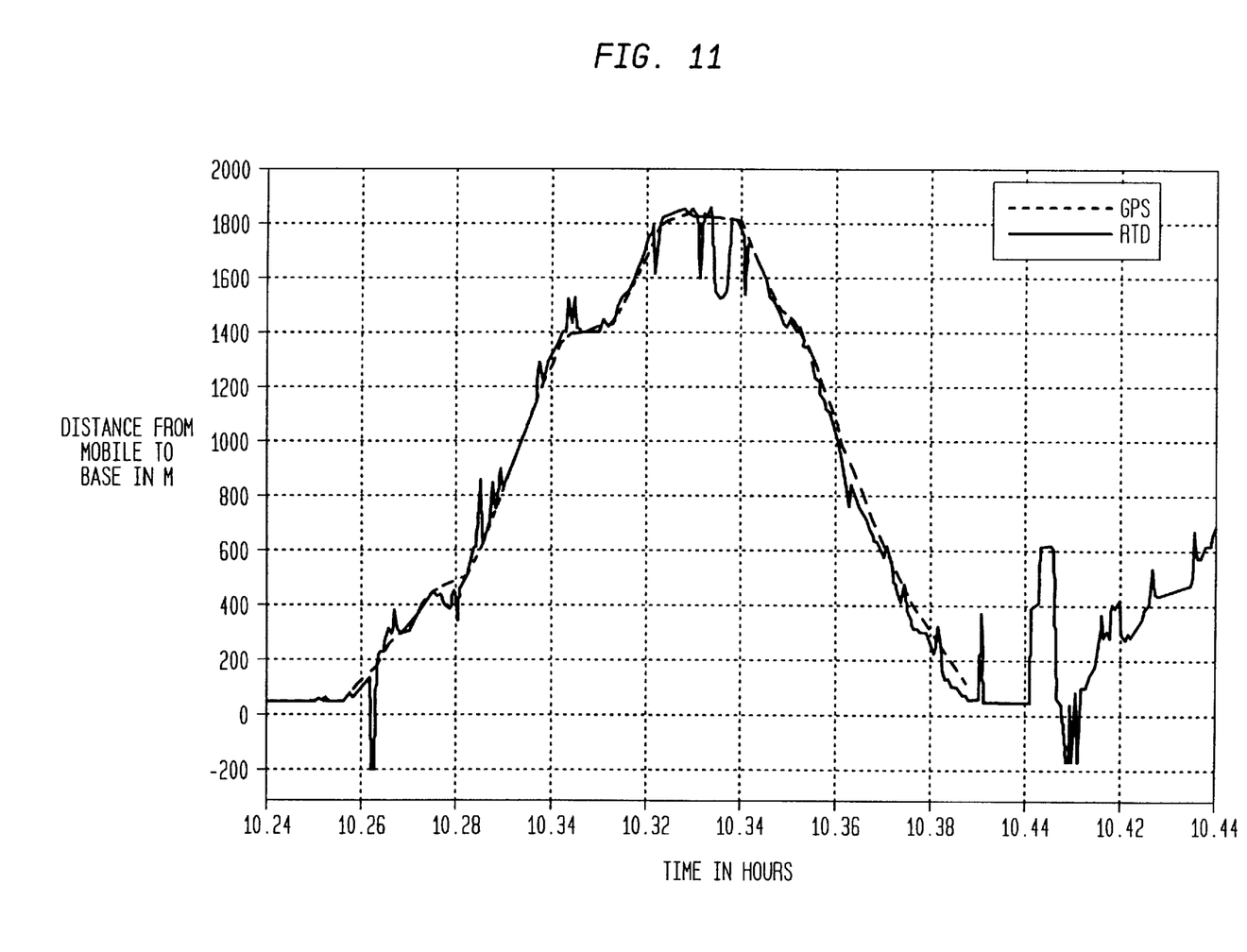
FIG. 11 illustrates round trip delay signal accuracy versus a GPS measurement.

Finally, the RTD was collected in a known fashion, using an RF call trace. FIG. 11 illustrates the accuracy of the RTD (solid line) versus GPS (dashed line) for a particular test field. The RTD was collected while the test wireless mobile unit was driven away from the base station until the call was dropped, and then when the wireless mobile unit was driven back towards the base station. The dashed line shown in FIG. 11 stands for the distance calculated utilizing the wireless mobile unit's GPS system and the known latitude and longitude of the base station. The solid line represents the distance calculated from the RTD information extracted from the RF call trace. A constant bias at 200 meters was subtracted from the distance calculated using the RTD, which was probably caused by the mobile and/or the transmitting /receiving delay at the base station. As can be seen from FIG. 11, the RTD provides a very accurate measurement of distance.

Figure 12:
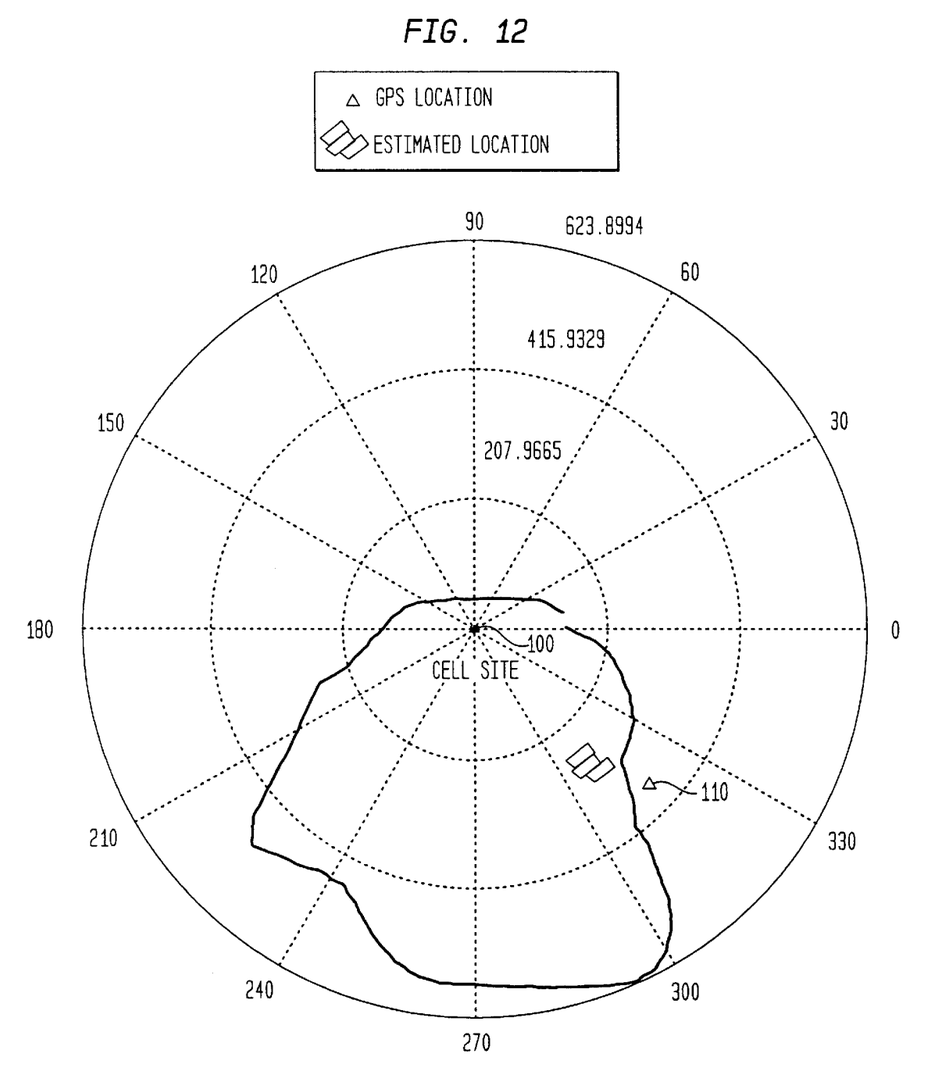
FIG. 12 illustrates a resultant location of the wireless mobile unit.

Once the AOA and RTD was obtained, the position of the wireless mobile unit was then determined in the manner described previously regarding equations (2) and (3) and FIG. 4. FIG. 12 illustrates the location of the wireless mobile unit along the drive route through which the lookup table was built. The solid line illustrates the drive route; the "X"-100 illustrates the base station location; the triangle (A) 110 represents the GPS location of the wireless mobile unit; and the cluster of circles 120 represent the location of the wireless mobile unit estimated from the RTD and AOA. The distances for the various circles shown in FIG. 12 represent distances in meters from the base station.

The invention being thus described, it will be obvious that the same may be varied in many ways. Such variations are not to be regarded as a departure from the spirit and scope of the invention, and all such modifications as would be obvious to one skilled in the art are intended to be included within the scope of the invention as claimed.

For example, the three step procedure of calculating RTD, AOA and then position of the wireless mobile unit can be extended to TDMA systems in a straight forward manner. In TDMA systems, the RTD is measured for time alignment between the base station and the wireless mobile unit. The strength of the incoming RF uplink signals from the wireless mobile unit is monitored closely to determine if any handoff should be triggered. Consequently, there is necessary and sufficient information for the aforementioned three step method to work properly. It should further be noted that although a multi-sector antenna at the base station is necessary, the use of a three sector antenna is merely exemplary. It is only necessary that the antennas are overlapped such that there is some time of one-to-one mapping between AOA and the ratio of the received amplitude measurements, i.e., the amplitude ratio of two sector antenna component outputs results in a unique angle of arrival.

Although the invention is designed to determine position of a wireless mobile unit when only a single BS detects the wireless mobile unit, it should be understood that if two base stations detect the MU, a more accurate position may be determined. In addition, various measurement combinations can be used from the two base stations. For example, using simple mathematics and the AOA from each of the two BSs, the location can be determined without the RTD) (since positions of each BS is known, only an intersection of the angles need be determined).

What is claimed is:

1. A method of determining a location of a wireless mobile unit, comprising the steps of:
    determining a distance between the wireless mobile unit and a multi-sector antenna belonging to a base station receiving a signal from the wireless mobile unit;
    determining an angle of arrival of the signal from stored angle measurements using at least two different antenna sector signal measurements of the signal as received at the base station, wherein angle measurements are stored in correspondence with antenna sector measurements of at least two different sectors of the multi-sector antenna; and
    determining the location of the wireless mobile unit from the received signal based upon the determined distance and the angle of the received signal.

2. The method of claim 1, wherein the distance is determined from a roundtrip delay (RTD) of the received signal.

3. The method of claim 1, wherein the distance is determined from a one-way delay of the received signal.

4. The method of claim 3, wherein the one-way delay is determined based upon the wireless mobile unit and base station having clocks referenced to a third source.

5. The method of claim 4, wherein the third source is a global positioning satellite.

6. The method of claim 1, wherein the measurements of the received signal are obtained from three different antenna sectors.

7. The method of claim 1, wherein the stored angle measurements include angles from zero to 360 degrees, each angle measurement being stored in correspondence with at least two different antenna sector measurements.

8. The method of claim 1, wherein the measurements of the received signal are obtained from three different antenna sectors.

9. The method of claim 1, wherein the angle of arrival is determined from a difference between two antenna sector signal measurements.

10. The method of claim 4, wherein the angle of arrival is determined from a difference between two antenna sector signal measurements.

11. The method of claim 1, wherein, for each combination of two different antenna sector measurements, a single different angle measurement is stored.

12. The method of claim 11, wherein the measurements of the received signal are obtained from three different antenna sectors.

13. The method of claim 1, wherein the angle measurements and corresponding signal measurements are stored in a lookup table (LUT), and wherein the angle of arrival is determined as an angle measurement of the LUT corresponding to at least two different antenna sector measurements of the received signal.

14. The method of claim 13, wherein the signal measurements stored in the LUT are difference measurements between pairs of the multi-sector antenna.

15. The method of claim 14, wherein difference measurements of a first sector pair correspond to angles from approximately zero degrees to approximately one hundred and twenty degrees, difference measurements of a second sector pair correspond to angles from approximately one hundred twenty degrees to approximately two hundred and forty degrees and difference measurements of a third sector pair correspond to angles from approximately two hundred and forty degrees to approximately three hundred and sixty degrees.

16. The method of claim 1, wherein a signal received by a single base station is used to determine the location of the wireless mobile unit.

17. The method of claim 1, wherein signals received by two base stations are used to determine the location of the wireless mobile unit.

18. An apparatus for determining a location of a wireless mobile unit using signal measurements from a single base station comprising:

a signal determining device adapted to determine a distance between the wireless mobile unit and a multi-sector antenna belonging to a base station receiving a signal from the wireless mobile unit;

a memory, adapted to store angle measurements in correspondence with antenna sector measurements of at least two different sectors of the multi-sector antenna; and a location calculator, adapted to determine an angle of arrival of the signal from the stored angle measurements using at least two different antenna sector signal measurements of the signal and adapted to determine the location of the wireless mobile unit from the received signal based upon the determined distance and angle of arrival of the received signal.

19. The apparatus of claim 18, wherein the signal determining device determines the distance from a roundtrip delay (RTD) of the received signal.

20. The apparatus of claim 18, wherein the distance is determined from a one-way delay of the received signal.

21. The apparatus of claim 20, wherein the one-way delay is determined based upon the wireless mobile unit and base station having clocks referenced to a third source.

22. The method of claim 21, wherein the third source is a global positioning satellite.

23. The apparatus of claim 18, wherein the location calculator receives measurements of the received signal from three different antenna sectors.

24. The apparatus of claim 18, wherein the location calculator receives measurements of the received signal from three different antenna sectors.

25. The apparatus of claim 18, wherein the angle of arrival is determined from a difference between two antenna sector signal measurements.

26. The apparatus of claim 18, wherein each combination of two different antenna sector measurements is stored in correspondence with a different angle measurement.

27. The apparatus of claim 26, wherein the location calculator receives measurements of the received signal from three different antenna sectors.

28. The apparatus of claim 18, wherein the memory stores angle measurements spanning angles from zero to 360 degrees.

29. The apparatus of claim 18, wherein the memory includes a lookup table (LUT).

30. The apparatus of claim 29, wherein the antenna sector measurements stored in the LUT are difference measurements between pairs of the multi-sector antenna.

31. The apparatus of claim 30, wherein difference measurements of a first sector pair correspond to angles from approximately zero degrees to approximately one hundred and twenty degrees, difference measurements of a second sector pair correspond to angles from approximately one hundred twenty degrees to approximately two hundred and forty degrees and difference measurements of a third sector pair correspond to angles from approximately two hundred and forty degrees to approximately three hundred and sixty degrees.

32. The apparatus of claim 18, wherein a signal received by a single base station is used to determine the location of the wireless mobile unit.

33. The apparatus of claim 18, wherein signals received by two base stations are used to determine the location of the wireless mobile unit.

* * * * *